United States Patent
Di et al.

(10) Patent No.: US 12,312,714 B2
(45) Date of Patent: May 27, 2025

(54) BIONIC NEUROMUSCULAR FIBER AS WELL AS PREPARATION METHOD AND USE THEREOF

(71) Applicant: SUZHOU INSTITUTE OF NANO-TECH AND NANO-BIONICS (SINANO), CHINESE ACADEMY OF SCIENCES, Suzhou (CN)

(72) Inventors: Jiangtao Di, Suzhou (CN); Lizhong Dong, Suzhou (CN); Qingwen Li, Suzhou (CN)

(73) Assignee: SUZHOU INSTITUTE OF NANO-TECH AND NANO-BIONICS (SINANO), CHINESE ACADEMY OF SCIENCES, Suzhou (CN)

( * ) Notice: Subject to any disclaimer, the term of this patent is extended or adjusted under 35 U.S.C. 154(b) by 0 days.

(21) Appl. No.: 18/269,575

(22) PCT Filed: Nov. 4, 2022

(86) PCT No.: PCT/CN2022/129916
§ 371 (c)(1),
(2) Date: Aug. 1, 2024

(87) PCT Pub. No.: WO2023/216528
PCT Pub. Date: Nov. 16, 2023

(65) Prior Publication Data
US 2025/0059685 A1   Feb. 20, 2025

(30) Foreign Application Priority Data
May 7, 2022   (CN) .......................... 202210495760.9

(51) Int. Cl.
D02G 3/44    (2006.01)
B25J 9/10    (2006.01)
(Continued)

(52) U.S. Cl.
CPC ............ D02G 3/441 (2013.01); B25J 9/1075 (2013.01); D01D 5/0038 (2013.01); D02G 3/02 (2013.01);
(Continued)

(58) Field of Classification Search
CPC .. D02G 3/02; D02G 3/36; D02G 3/38; D02G 3/441; D01D 5/0038; B25J 9/1075; D10B 2401/16; D06M 15/643
See application file for complete search history.

(56) References Cited

U.S. PATENT DOCUMENTS 10,083,799 B2 *  9/2018  Zhamu ................... H01G 11/48
10,283,280 B2 *  5/2019  Zhamu ................... H01G 11/74
(Continued)

FOREIGN PATENT DOCUMENTS

CN    110733031 A    1/2020
CN    111735382 A   10/2020
(Continued)

OTHER PUBLICATIONS

Yulian Wang, et al., High-twist-pervaded electrochemical yarn muscles with ultralarge and fast contractile actuations, Mater. Horiz., 2020, pp. 3043-3050, vol. 7.
(Continued)

*Primary Examiner* — Shaun R Hurley
(74) *Attorney, Agent, or Firm* — Bayramoglu Law Offices LLC (57) ABSTRACT

A bionic neuromuscular fiber as well as a preparation method and use thereof are provided. The bionic neuromuscular fiber includes a carbon nanotube fiber core, an intermediate layer, a substrate layer, and a sensing layer which are coaxially and successively sheathed from inside to outside, and is twisted to form a helical shape. The intermediate layer and the substrate layer are both made of
(Continued)

polymer materials, and the thermal expansion coefficient of the intermediate layer is larger than that of the substrate layer. The sensing layer includes a carbon-based conductive material at least containing MXene. In the present application, the sensing layer and the intermediate layer are both multifunctional, the sensing layer is used as not only a capacitor electrode but also a resistance sensing element, and the intermediate layer is used as not only a thermal driving element but also a dielectric layer.

15 Claims, 6 Drawing Sheets

(51) Int. Cl.
*D01D 5/00* (2006.01)
*D02G 3/02* (2006.01)
*D02G 3/36* (2006.01)
*D02G 3/38* (2006.01)
*D06M 15/643* (2006.01)
*D06M 101/40* (2006.01)

(52) U.S. Cl.
CPC ............. *D02G 3/36* (2013.01); *D02G 3/38* (2013.01); *D06M 15/643* (2013.01); *D06M 2101/40* (2013.01); *D10B 2101/122* (2013.01); *D10B 2321/042* (2013.01); *D10B 2321/10* (2013.01); *D10B 2331/02* (2013.01); *D10B 2401/04* (2013.01); *D10B 2401/10* (2013.01)

(56) References Cited

U.S. PATENT DOCUMENTS

| | | | |
|---|---|---|---|
| 10,637,067 B2* | 4/2020 | Zhamu | H01M 4/382 |
| 2019/0096540 A1 | 3/2019 | Baughman et al. | |
| 2019/0316277 A1 | 10/2019 | Tao et al. | |
| 2021/0262121 A1* | 8/2021 | Kim | D01D 5/06 |
| 2021/0396607 A1* | 12/2021 | Uzun | G01L 1/2287 |

FOREIGN PATENT DOCUMENTS

| | | | |
|---|---|---|---|
| CN | 111826765 A | | 10/2020 |
| CN | 112680966 A | | 4/2021 |
| CN | 113322667 A | | 8/2021 |
| CN | 113654695 A | * | 11/2021 |
| CN | 114060279 A | | 2/2022 |
| CN | 114108152 A | * | 3/2022 |
| CN | 114150399 A | | 3/2022 |
| CN | 114790657 A | | 7/2022 |
| KR | 101509402 B1 | | 4/2015 |
| WO | 2020231741 A2 | | 11/2020 |

OTHER PUBLICATIONS

Carter S. Haines, et al., Artificial Muscles from Fishing Line and Sewing Thread, Science, 2014, pp. 868-872, vol. 343.

Ke He, et al., An Artificial Somatic Reflex Arc, Adv. Mater., 2020, pp. 1905399(1 of 8), vol. 32.

* cited by examiner

BIONIC NEUROMUSCULAR FIBER AS WELL AS PREPARATION METHOD AND USE THEREOF

CROSS REFERENCE TO THE RELATED APPLICATIONS

This application is the national phase entry of International Application No. PCT/CN2022/129916, filed on Nov. 4, 2022, which is based upon and claims priority to Chinese Patent Application No. 202210495760.9, filed on May 7, 2022, the entire contents of which are incorporated herein by reference.

TECHNICAL FIELD

The present application belongs to the technical field of material sciences, especially the technical field of artificial muscles, and particularly relates to a bionic neuromuscular fiber as well as a preparation method and use thereof.

BACKGROUND

The traditional rigid robots achieve driving by mechanical structures and motors, and realize signal recognition and feedback functions by a metal-based gravity sensor and a photograph system. However, huge mechanical equipment and complicated circuit integration often restrict the miniaturization and flexibility of these robots. In recent years, an artificial muscle technology stimulating a biological muscle structure has been rapidly developed and opens up a new idea for manufacturing smaller and more flexible driver units. In addition, the bionic muscular fiber integrated with multiple functions (bidirectional driving, signal recognition, self-perception, etc.) simplifies the complexity of a motion system and provides a valuable basis for development of flexible robots.

The driving performance of the bionic muscle fiber is being stably developed, and is sufficiently adaptive to complicated motion of different structures of software robots. The electrochemical carbon nanotube yarn muscle reported by Wang et al., Materials Horizons 2020, 7(11), 3043-3050, achieved 62.4% super shrinkage. Haines et al., Science 2014, 343(6173), 868-872, further proved that an electrothermal-driven nylon muscle fiber achieved the maximum specific work of 2.48 $Jg^{-1}$ and the maximum mechanical output power of 27.1 $Wg^{-1}$. However, the development of multifunctional integration of bionic muscle fibers is still a challenge, especially in the aspects of signal perception and feedback.

In the synergistic effect of perceiving a signal to complete a drive action, at present, only a few of film-based drivers achieve the perceptive function due to the complexity of fiber-based artificial muscles. He et al., Advanced Materials 2020, 32(4), 1905399, simulated a body reflex arc to manufacture an electrochemical film actuator with the perceptive function, the actuator can be excited in response to the stimulus of a tactile pressure, however, the independent design of a pressure sensing unit and an actuating unit increases the complexity of the system. In addition, the currently reported problems of low feedback signal accuracy, weak linear correlation and poor cycle stability of self-perceptive bionic muscle fibers restrict the further development of the self-perceptive bionic muscle fibers. Multifunctional bionic muscle fibers integrating perception-driving-feedback functions on the same fiber have not been reported yet.

To sum up, the existing technology mainly has the following disadvantages: 1) the bionic muscle fibers combining perception and driving functions are mainly piezoresistive perceptive, with limited application scenarios; moreover, perception and driving units are separately designed, which cannot meet the requirements of structural integration and increases the complexity of devices. 2) The bionic muscle fiber combined with driving and feedback has the problems such as low feedback signal accuracy, weak linear correlation, poor cycle stability, which restricts the further development of the self-perceptive bionic muscle fiber. 3) At present, there are no reports on a design of simultaneously integrating perception, driving and feedback functions, and in most cases, each unit is separately designed, which increases the bulkiness and complexity of the system.

Therefore, it is necessary to develop a multifunctional bionic muscle fiber integrated with perception-driving-feedback functions to further reduce the complexity and bulkiness of driving and sensing units of an intelligent robot.

SUMMARY

In view of the defects in the prior art, the objective of the present application is to provide a bionic neuromuscular fiber as well as a preparation method use thereof.

In order to achieve the above objective of the present disclosure, the technical solution adopted by the present application is as follows:

In the first aspect, the present application provides a bionic neuromuscular fiber, comprising a carbon nanotube fiber core, an intermediate layer, a substrate layer and a sensing layer which are coaxially and successively sheathed from inside to outside, the bionic neuromuscular fiber being twisted to form a helical shape;

the intermediate layer and the substrate layer are both made of polymer materials, and the thermal expansion coefficient of the intermediate layer is larger than that of the substrate layer;

the sensing layer comprises a carbon-based conductive material at least containing MXene.

In the second aspect, the present application also provides a preparation method of a bionic neuromuscular fiber described above, comprising:

1) wrapping a first polymer material on a carbon nanotube fiber core to form an intermediate layer to obtain a first precursor fiber;
2) wrapping a second polymer material on the first precursor fiber to form a substrate layer, and twisting to form a helical shape to obtain a second precursor fiber; and
3) constructing a sensing layer comprising a carbon-based conductive material at least containing MXene on the surface of the second precursor fiber to obtain the bionic neuromuscular fiber;

wherein, the thermal expansion coefficient of the first polymer material is larger than that of the second polymer material.

In the third aspect, the present application also provides use of the above bionic neuromuscular fiber in manufacturing software robots.

Based on the above technical solution, compared with the prior art, the present application at least has the following beneficial effects:

In the bionic neuromuscular fiber as well as the preparation method and use thereof provided by the present application, the electrothermal driving function is achieved by the electrothermal effect of the carbon nanotube fiber core and the thermal driving phenomenon of the at least intermediate layer; the proximity perception function is achieved by capacitance change between the sensing layer and the carbon nanotube fiber core; meanwhile, the motion feedback function is achieved by utilizing resistance change of the sensing layer caused by dynamic change of the neuromuscular fiber, wherein the sensing layer, the carbon nanotube core and the intermediate are all multifunctional, the sensing layer is used as both a capacitor electrode and a resistance sensing element, the carbon nanotube core is used as both an electric heating element and a capacitor electrode, and the intermediate layer is used as both a thermal driving element and a dielectric layer. Therefore, the present application realizes the integration of three functions at a lower structural complexity so as to provide a wider space for the development of flexible robots.

The above descriptions are only overviews of the technical solution of the present application. To make those skilled in the art more clearly understand the technical means of the present application and implement them according to the content of the specification, the present application will be illustrated in detail according to preferred embodiments of the present application in combination with accompanying drawings.

DETAILED DESCRIPTION OF THE EMBODIMENTS

In view of the defects in the prior art, the inventors of this case put forward the technical solution of the present application after long-term research and extensive practice. The objective of the present application is to provide a bionic neuromuscular fiber with a perception-driving-feedback integrated function for driving and sensing units of intelligent robots, and mechanical structures of flexible and miniaturized intelligent robots. Next, the technical solution, its implementation process and principle will be further explained.

Many specific details are described in the following description to facilitate full understanding of the present application. However, the present application can also be implemented in other ways different from those described here. Therefore, the protective scope of the present application is not limited by the specific embodiments disclosed below.

Furthermore, the relationship terms such as "first" and "second" are only used for distinguishing one component or method step with the same name from another component, but not necessarily requiring or implying any such actual relationship or order between these components or method steps.

Referring to FIG. 1-FIG. 5, the embodiments of the present application provide a bionic neuromuscular fiber, comprising a carbon nanotube fiber core, an intermediate layer, a substrate layer and a sensing layer which are coaxially and successively sheathed from inside to outside, and the bionic neuromuscular fiber being twisted to form a helical shape; the intermediate layer and the substrate layer being both made of polymer materials, and the thermal expansion coefficient of the intermediate layer being larger than that of the substrate layer; the sensing layer comprising a carbon-based conductive material at least containing MXene.

In the present application, the above substrate layer together with the sensing layer can be referred to as a sheathing layer. We imitated neuromuscular systems of mammals, and reported a bionic neuromuscular fiber with a perception-driving-feedback function on the same fiber for the first time. The bionic neuromuscular fiber is composed of a multilayer coaxial structure, including a carbon nanotube fiber core, a polydimethylsiloxane intermediate layer and a polyacrylonitrile electrospun nanofiber substrate coated with MXene/single-walled carbon nanotubes. Through this simple coaxial structure design, the integrated bionic neuromuscular fibers can reduce the complexity of the sensing and driving units of the intelligent robots. In addition, such the bionic neuromuscular fiber can perceive proximity excitation signal to execute a command driven by electrothermal response, and meanwhile provide the feedback function driving the whole contraction and relaxation process. The maximum proximity perception range of the bionic neuromuscular fiber in the non-contact mode is 14 cm. Compared with the previously reported work, the real-time feedback relative resistance change signal in the driving process has a better linear relationship and cycle stability, and the self-perceptive signal in the whole driving process is completely linear.

As some typical application examples, the above bionic neuromuscular fiber can be composed of multi-layer coaxial structures, and comprises a carbon nanotube fiber core, a polydimethylsiloxane intermediate layer, a polyacrylonitrile electrospun nano fiber substrate layer wrapped with MXene and a single-walled carbon nanotube, and a sensing layer. Through the simple coaxial structure design, the integrated bionic neuromuscular fiber can reduce the complexity of the sensing and drive units of the intellectual robots.

In some embodiments, the diameter of carbon nanotube fiber core is preferably 150-170 µm;

In some embodiments, the thickness of the intermediate layer can be preferably 230-250 µm, the thickness of the substrate layer can be preferably 22-25 µm, and the thickness of the sensing layer can be preferably 5-7 µm;

In some embodiments, the thermal expansion coefficient of the intermediate layer can be preferably 330-350 ppm/° C., and the thermal expansion coefficient of the substrate layer can be preferably 150-175 ppm/° C.

In some embodiments, the material of the intermediate layer comprises a combination of any one or more than two of polydimethylsiloxane, nylon and polytetrafluoroethylene.

In some embodiments, the electrothermal inert response substrate layer comprises a three-dimensional porous structure preferably having a pore size of 0.8-1 µm formed by intertwining polymer nano fibers.

In some embodiments, the material of the substrate layer comprises a combination of any one or more than two of polyacrylonitrile and polyvinylidene fluoride.

In some embodiments, the carbon-based conductive material also comprises a combination of any one or more than two of a single-walled carbon nanotube, a multi-walled carbon nanotube and lamellar graphene.

In some embodiments, in the carbon-based conductive material, a mass ratio of the carbon nanotube and/or graphene to MXene is 1:15-1:25.

In some embodiments, the bionic neuromuscular fiber at least simultaneously has three functions such as electrothermal driving, motion feedback and proximity perception.

Figure 3:
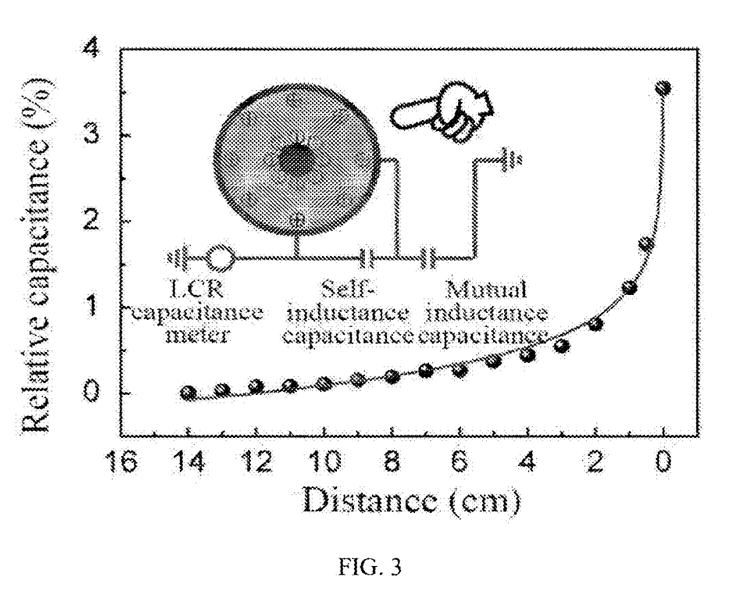
FIG. 3 is a test result graph of a proximity perception function of a bionic neuromuscular fiber provided by a typical embodiment of the present application.

As some typical application examples, FIG. 3 shows a principle graph of a bionic neuromuscular fiber having a proximity perception function. This fiber can be simply equivalent to being composed of a polydimethylsiloxane dielectric layer clamped between two carbon-based electrodes. This simple sandwich structure utilizes mutual inductance generated by the polydimethylsiloxane dielectric layer between orthogonal electrodes to provide highly sensitive capacitance change. Proximity perception can be defined as an object that is inserted into a fringe electric field, causing the decrease of a capacitance of equipment. In this simple circuit, there are two effective capacitors: a self-inductance capacitor (between two carbon-based electrodes) and a mutual inductance capacitor (between a sensor and an object). The human body acts as a grounding conductor, so the charge can pass through the body to be transferred to the ground with the help of electric field lines. This reduces the intensity of an electric field between two electrode plates of the self-inductance capacitor, thereby reducing the charge stored in the self-inductance capacitor. When the proximity sensor perceives the proximity of fingers, a distance between the two electrode plates of the mutual inductance capacitor decreases, resulting in the increase of capacitance. However, since the self-inductance and mutual inductance capacitors are connected in series, the measured total capacitance is reduced. Theoretically, any accessible object can be detected by using the same mechanism, because the total capacitance value of the series capacitor will depend on the dielectric constant of the accessible object.

Meanwhile, the above bionic neuromuscular fiber contracts has the sheathing layer structure resistance change while contracting, for example, the motion position state of the fiber can be traced in real time by utilizing the change in the relative resistance of the sensing layer of the MXene/single-walled carbon nanotube. In addition, the bionic neuromuscular fiber shows a linear change in relative resistance in the whole process under different driving quantities. Through the feedback relative resistance change signal, the motion position of the bionic neuromuscular fibers can be detected at all times without a rangefinder. Moreover, due to the existence of the substrate layer with a low thermal expansion coefficient, the changes in the above resistance and motion position are very close to linearity, which improves the accuracy and adaptability of motion feedback.

Figure 5:
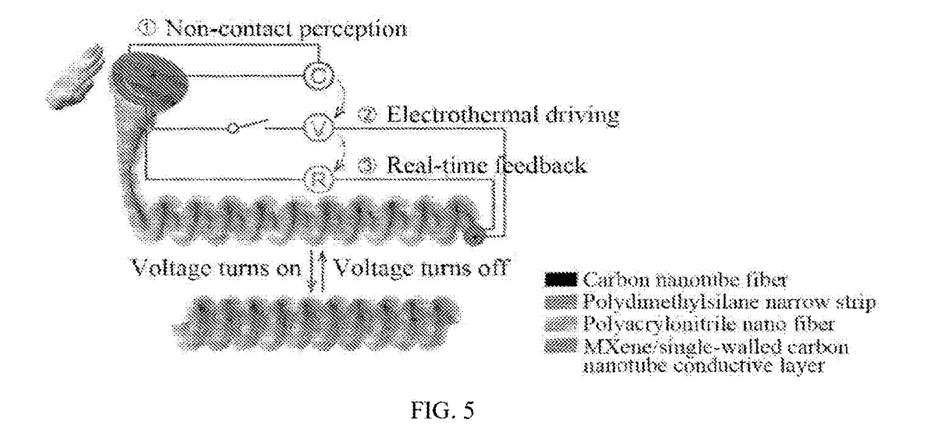
FIG. 5 is a diagram of a working principle of a bionic neuromuscular fiber provided by a typical embodiment of the present application.

FIG. 5 is a diagram showing the working principle of the above bionic neuromuscular fiber and meanwhile shows a control system for controlling the above bionic neuromuscular fiber, wherein through simple circuit design, the working principle of the bionic neuromuscular fiber mainly exhibits that a non-contact capacitance excitation signal can be perceived; after the capacitance signal exceeds a certain threshold, the fiber perceives the signal to respond to the electric heating to complete the driving action, and meanwhile the epidermal sensing layer can feed back the contraction state of the fiber through the real-time change of the resistance.

Figure 1:
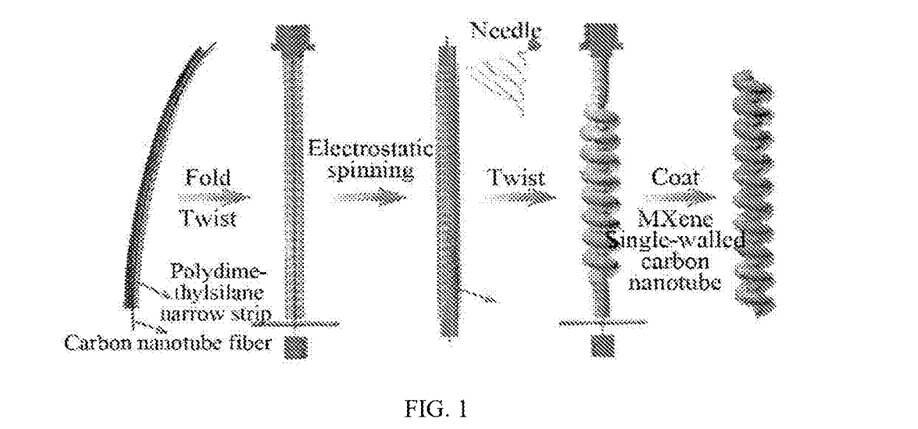
FIG. 1 is a flowchart of a preparation method of a bionic neuromuscular fiber provided by a typical embodiment of the present application.

Continue to refer to FIG. 1, the embodiments of the present application further provide a preparation method of a bionic neuromuscular fiber, comprising the following steps:
1) wrapping a first polymer material on a carbon nanotube fiber core to form an intermediate layer to obtain a first precursor fiber;
2) wrapping a second polymer material on the first precursor fiber to form a substrate layer, and twisting to form a helical shape to obtain a second precursor fiber; and
3) constructing a sensing layer comprising a carbon-based conductive material at least containing MXene on the surface of the second precursor fiber to obtain the bionic neuromuscular fiber;

wherein, the thermal expansion coefficient of the first polymer material is larger than that of the second polymer material.

In some embodiments, step 1) specifically comprises the following steps:
wrapping a film composed of the first polymer material on the carbon nanotube fiber core to obtain a combined body;
applying a first twist to the combined body to obtain the first precursor fiber;
or, attaching the first polymer material to the carbon nanotube fiber core through electrostatic spinning to form the intermediate layer.

In some embodiments, the first twist can be 750-950 turns/m.

In some embodiments, step 2) specifically comprises the following steps:
providing a precursor solution comprising the second polymer material and a first solvent;
carrying out electrostatic spinning on the precursor solution and removing the first solvent to form the substrate layer;
applying a second twist to an entire composed of the substrate layer and the first precursor fiber to be twisted to form the helical shape.

In some embodiments, the electrostatic spinning has a voltage of 12-20 kV, a flow rate of 0.5-1.5 mL/h and a working distance of 6-12 cm.

In some embodiments, the second twist can be 4300-4700 turns/m.

In some embodiments, step 3) specifically comprises the following steps:
providing a dispersion solution comprising a carbon-based conductive material, MXene and a second solvent; and
coating the dispersion solution on the surface of the second precursor fiber and removing the second solvent to obtain the bionic neuromuscular fiber.

The embodiments of the present application further provide use of the above bionic neuromuscular fiber in manufacturing software robots.

Based on the exemplary technical solution of the above bionic neuromuscular fiber and manufacturing method thereof, the applicant believes that compared with the prior art, some embodiments of the present application at least have the following advantages:
1) since the carbon nanotube has good electrical properties and polydimethylsiloxane has a good thermal expansion coefficient, the prepared bionic neuromuscular fiber has excellent driving performance and cycle stability, and is expected to be applied to the drive units of the next-generation intelligent robots, thereby reducing the complexity and bulkiness of the drive unit.
2) With the help of the electrothermal inert response sheathing layer of the polyacrylonitrile electrospun three-dimensional porous nanowire, the feedback signal of the whole drive and relaxation process of the bionic neuromuscular fiber is perfectly close to a linear relationship, which was not realized in previous reports.
3) Based on the non-contact capacitance perceptive response of the bionic neuromuscular fiber with the multilayer coaxial structure, the bionic neuromuscular fiber realizes the multi-functional integration of perception-driving-feedback functions so as to greatly reduce the structure of the sensing unit, and is expected to be applied to the next-generation intelligent robots, thereby further reducing the complexity and bulkiness of the driving and sensing units.
4) The used bionic neuromuscular fiber is simple in preparation method and is easy to use.

Next, the technical solution of the present application will be further described in detail through several embodiments in combination with accompanying drawings. However, the selected embodiments are only used to explain the present application but not limit the scope of the present application.

Example 1

This example provides a preparation process of a bionic neuromuscular fiber, specifically comprising the following steps:
Step 1: a carbon nanotube fiber with a length of 44 cm was completely wrapped with a polydimethylsiloxane film with a length of 40 cm, width of 5 mm and 50 μm, then one end of the fiber was fixed on the tip of a stepping motor, and the other end of the fiber is suspended with 10 g of clamp. The whole narrow strip was suspended between the clamp and the stepping motor, and then a 818 turns/m twist was inserted.
Step 2: 4.8 g of polyacrylonitrile powder was dissolved into 35.2 g of N,N-dimethylformamide solvent to prepare 12% precursor solution. The solution was stirred for 4 h in water bath at 80° C., and then stirred for 2 h at room temperature. Electrostatic spinning was performed at a flow rate of 0.8 mLh$^{-1}$, and an applied voltage was 16 kV. The tail end of the twisted straight carbon nanotube fiber wrapped with polydimethylsiloxane was fixed on a metal clamp and rotated around a shaft at the speed of 300 rpm to receive the electrospun nano fiber. The fiber was kept from an injection spray by a distance of 8 cm. The obtained product was placed in a vacuum oven and kept for 10 h at 50° C. to remove the residual solvent. Subsequently, 4410 turns/m twist was inserted into the obtained fiber to form a helical fiber.
Step 3: 0.1 g of multilayer MXene powder was added into 5 ml of single-walled carbon nanotube dispersion solution (0.1%) to realize uniform ultrasonic dispersion. Then, the helical fiber wrapped with polyacrylonitrile was coated with such the uniform dispersion solution of the MXene/single-walled carbon nanotube to obtain the bionic neuromuscular fiber with a three-dimensional conductive layer.

Figure 2A:
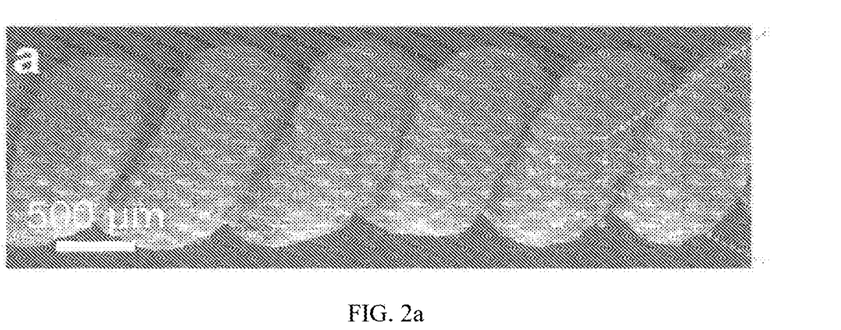
FIG. 2A-FIG. 2E are electron scanning microscopy pictures of a local microstructure of a bionic neuromuscular fiber provided by a typical embodiment of the present application.
Figure 2B:
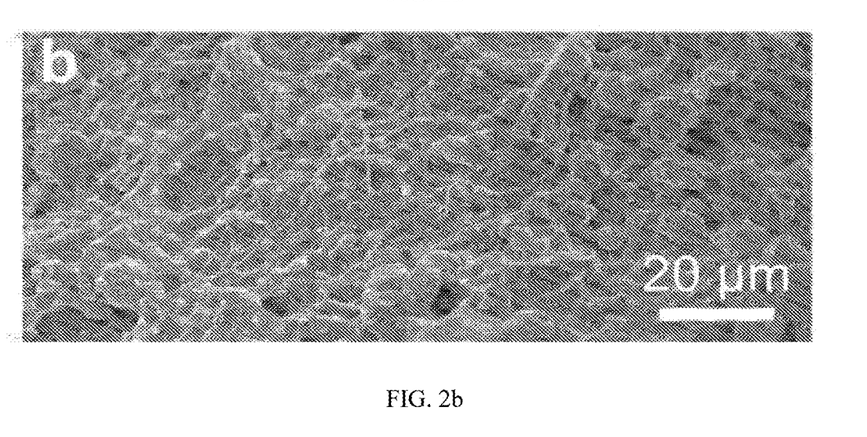
Figure 2C:
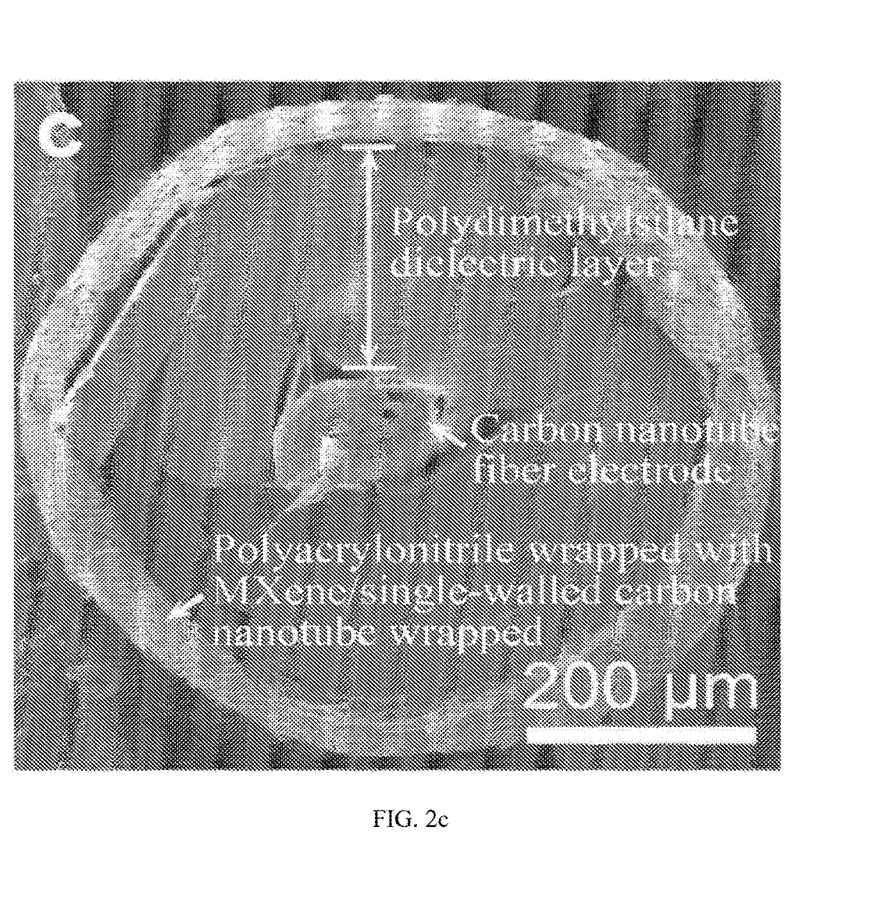
Figure 2D:
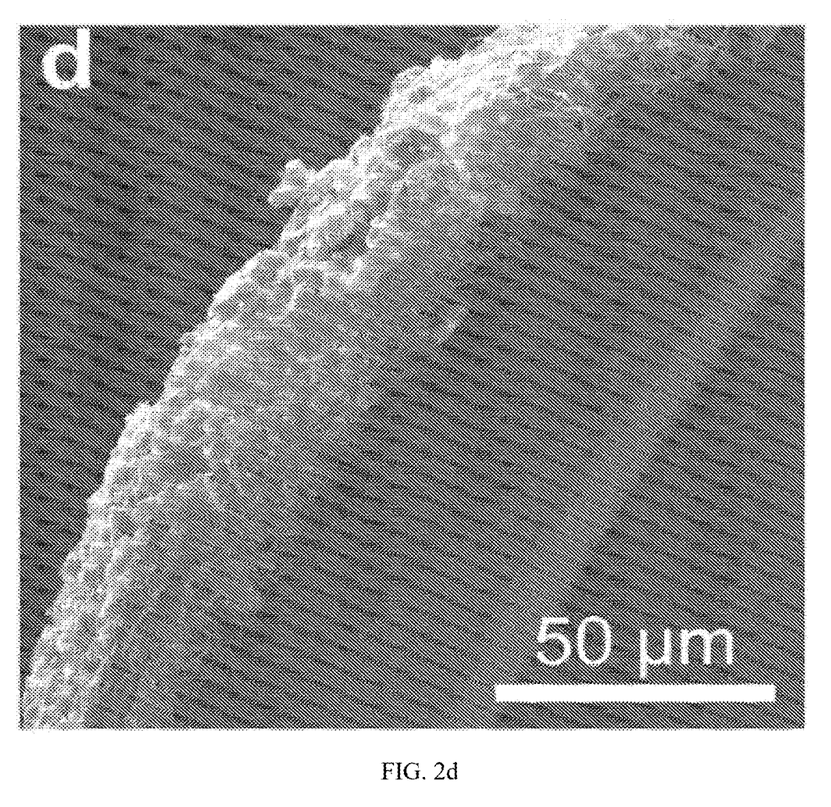
Figure 2E:
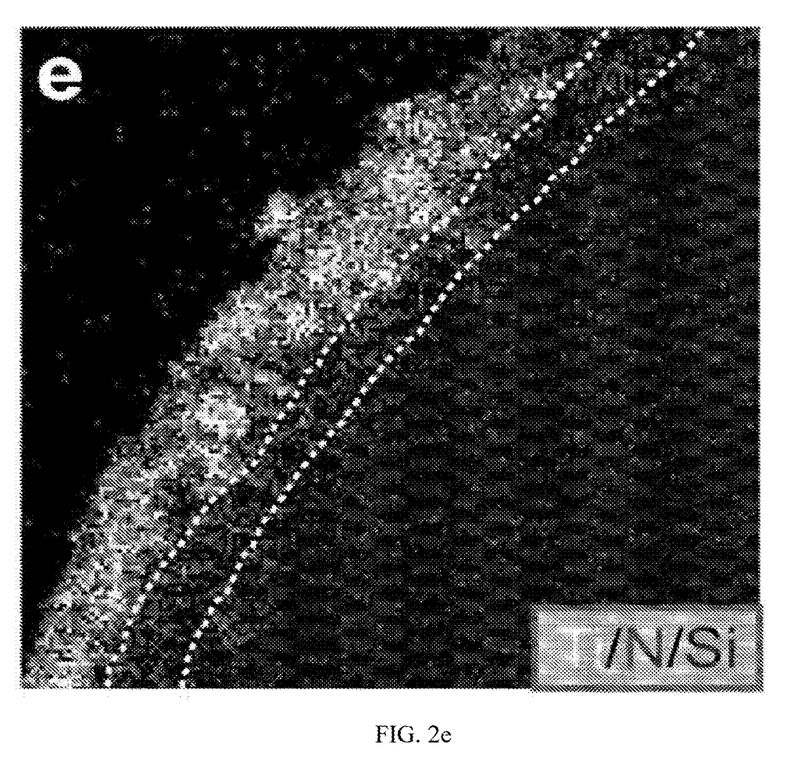

FIG. 2A is a morphologic map of the above bionic neuromuscular fiber. It can be seen from FIG. 2A that the twisted fiber has a relatively uniform helical structure and a diameter of about 600 μm. FIG. 2B is an enlarged graph of a surface morphology of the above bionic neuromuscular fiber. It can be seen from the FIG. 2B that the MXene/single-walled carbon nanotube dispersion solution is extremely uniformly coated onto the electrospun polyacrylonitrile nanofiber. FIGS. 2C-2E are cross-sectional views of the above bionic neuromuscular fiber. It can be clearly seen from FIGS. 2C-2E that the coaxial structure of the fiber comprises a carbon nanotube fiber core, a polydimethylsiloxane intermediate layer and a sheathing layer of a polyacrylonitrile electrospun nanofiber wrapped with MXene and single-walled carbon nanotube.

FIG. 3 is a test graph of a non-contact perception function of the above bionic neuromuscular fiber. The bionic neuromuscular fiber can perceive non-contact relative capacitance change of a maximum distance of 14 cm.

Figure 4A:
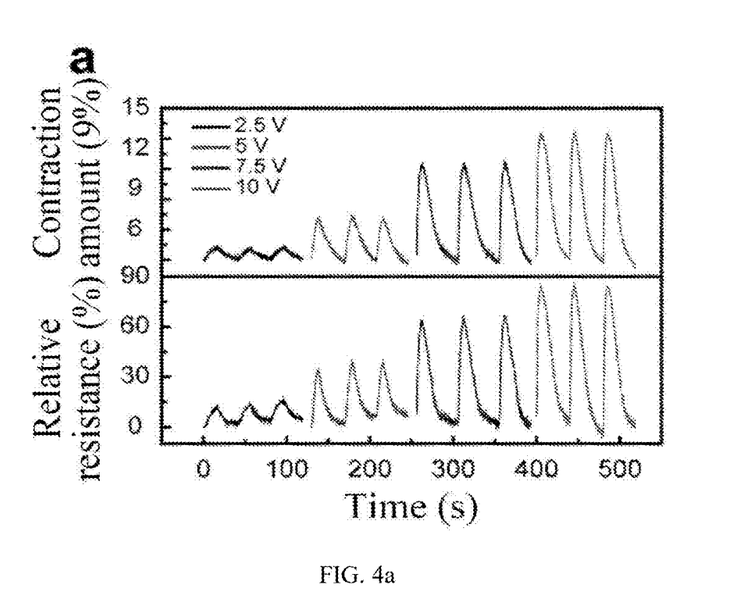
FIG. 4A-FIG. 4B are a test result graph of a driving and feedback function of a bionic neuromuscular fiber provided by a typical embodiment of the present application.
Figure 4B:
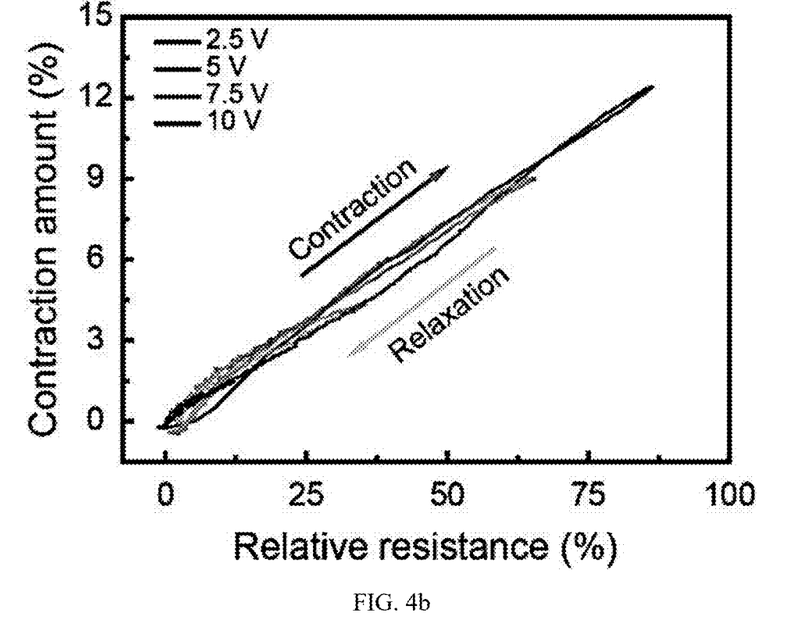

FIG. 4A-FIG. 4B are a test graph of a driving and feedback function of the above bionic neuromuscular fiber, wherein FIG. 4A is a relationship graph of relative resistance and contraction amount of the above bionic neuromuscular fiber varying with time, FIG. 4B is a corresponding relationship graph of relative resistance and contraction amount of the above bionic neuromuscular fiber. It can be seen from FIG. 4A-FIG. 4B that the above bionic neuromuscular fiber has maximum contraction amount of 14% at a voltage of 10V is 14%, and meanwhile exhibits different contraction amounts at different voltages, and the contraction amount is linearly increased with the increase of the voltage. The bionic neuromuscular fiber has sheathing layer structure resistance change while contracting, and the following performance and linear degree of the resistance change are both good.

Example 2

This example provides a preparation process of a bionic neuromuscular fiber, which is basically the same as that in example 1, except that:
In step 1, the same conditions and process parameters are used, and a nylon intermediate layer is formed on the carbon nanotube fiber core through electrostatic spinning.
The prepared bionic neuromuscular fiber has three functions such as electrothermal driving, motion feedback and proximity perception that are the same as those in example 1, and its feedback linear degree and proximity perception distance and flexibility are similar to those in example 1 as well.

Example 3

This example provides a preparation process of a bionic neuromuscular fiber, which is basically the same as that in example 1, except that:
In step 2, the same conditions and process parameters are used, and a polyvinylidene fluoride substrate layer is formed through electrostatic spinning (the electrostatic spinning has a voltage of 20 kV, a flow rate of 1 mL/h and a work distance of 8 cm).
The prepared bionic neuromuscular fiber has three functions such as electrothermal driving, motion feedback and proximity perception that are the same as those in example 1, and its feedback linear degree and proximity perception distance and flexibility are similar to those in example 1 as well.

Example 4

This example provides a preparation process of a bionic neuromuscular fiber, which is basically the same as that in example 1, except that:

In step 3, a multi-walled carbon nanotube is used to replace a single-walled carbon nanotube.

The prepared bionic neuromuscular fiber has three functions such as electrothermal driving, motion feedback and proximity perception that are the same as those in example 1, and its feedback linear degree and proximity perception distance and flexibility are similar to those in example 1 as well.

Comparative Example 1

The substrate layer is in a dense structure rather than a three-dimensional electrospun nanowire porous structure. The substrate layer has poor surface carbon-based material adhesiveness, and is easy to fall off so as to cause device damage; in addition, the linear relationship of the feedback signal is poor.

Comparative Example 2

MXene is omitted, and only the single-walled carbon nanotube is used as the sensing layer. MXene is in a multilayer sheet structure, so subtle pressure changes can be captured by changes in the layer structure. MXene increases the sensitivity of a strain-perceptive sensing layer. When this comparative example contains no MXene, the sensitivity and the lowest detection limit of the device are affected.

Comparative Example 3

Compared with example 1, the carbon nanotube is replaced with a metal nanowire. Since the metal nanowire is a rigid material, if the carbon-based conductive material in the sensing layer is replaced with the metal nanowire, the driving performance of the bionic neuromuscular fiber will be directly affected.

Based on the above examples and comparative examples, it can be clarified that in the bionic neuromuscular fiber as well as the preparation method and use thereof provided by the present application, the electrothermal driving function is achieved by the electrothermal effect of the carbon nanotube fiber core and the thermal driving phenomenon of the at least intermediate layer; the proximity perception function is achieved by capacitance change between the sensing layer and the carbon nanotube fiber core; meanwhile, the motion feedback function is achieved by utilizing resistance change of the sensing layer caused by dynamic change of the neuromuscular fiber, wherein the sensing layer, the carbon nanotube core and the intermediate are all multifunctional, the sensing layer is used as both a capacitor electrode and a resistance sensing element, the carbon nanotube core is used as both an electric heating element and a capacitor electrode, and the intermediate layer is used as both a thermal driving element and a dielectric layer. Therefore, the present application realizes the integration of three functions at a lower structural complexity so as to provide a wider space for the development of flexible robots. Moreover, the linear degree of the motion feedback function provided by the present application is extremely high, ensuring that the accuracy and adaptability of the motion feedback.

It should be understood that the above examples are only for illustrating the technical conception and features of the present application for the purpose that those skilled in the art can understand the content of the present application and implement the present application but not limiting the protective scope of the present application. Equivalent changes or modifications made according to the spirit of the present application are all included within the protective scope of the present application.

What is claimed is:

1. A bionic neuromuscular fiber, comprising a carbon nanotube fiber core, an intermediate layer, a substrate layer, and a sensing layer, wherein the carbon nanotube fiber core, the intermediate layer, the substrate layer, and the sensing layer are coaxially and successively sheathed from inside to outside, the bionic neuromuscular fiber is twisted to form a helical shape;
the intermediate layer and the substrate layer are both made of polymer materials, and a thermal expansion coefficient of the intermediate layer is larger than a thermal expansion coefficient of the substrate layer;
the sensing layer comprises a carbon-based conductive material at least containing MXene.

2. The bionic neuromuscular fiber according to claim 1, wherein a diameter of the carbon nanotube fiber core is 150-170 μm;
and/or, a thickness of the intermediate layer is 230-250 μm, a thickness of the substrate layer is 22-25 μm, and a thickness of the sensing layer is 5-7 μm;
and/or, the thermal expansion coefficient of the intermediate layer is 330-350 ppm/° C., and the thermal expansion coefficient of the substrate layer is 150-175 ppm/° C.

3. The bionic neuromuscular fiber according to claim 1, wherein a material of the intermediate layer comprises a combination of one or more than two of polydimethylsiloxane, nylon, and polytetrafluoroethylene;
and/or, the substrate layer is an electrothermal inert response substrate layer comprising a three-dimensional porous structure having a pore size of 0.8-1 μm formed by intertwining polymer nano fibers;
and/or, a material of the substrate layer comprises a combination of one or more of polyacrylonitrile and polyvinylidene fluoride.

4. The bionic neuromuscular fiber according to claim 1, wherein the carbon-based conductive material further comprises a combination of one or more than two of a single-walled carbon nanotube, a multi-walled carbon nanotube, and lamellar graphene.

5. The bionic neuromuscular fiber according to claim 4, wherein in the carbon-based conductive material, a mass ratio of the carbon nanotube and/or the lamellar graphene to the MXene is 1:15-1:25.

6. The bionic neuromuscular fiber according to claim 1, wherein the bionic neuromuscular fiber at least simultaneously has three functions of proximity perception, electrothermal driving, and motion feedback.

7. A preparation method of a bionic neuromuscular fiber, comprising:
1) wrapping a first polymer material on a carbon nanotube fiber core to form an intermediate layer to obtain a first precursor fiber;
2) wrapping a second polymer material on the first precursor fiber to form a substrate layer, and twisting the substrate layer to form a helical shape to obtain a second precursor fiber; and
3) constructing a sensing layer comprising a carbon-based conductive material at least containing MXene on a surface of the second precursor fiber to obtain the bionic neuromuscular fiber;

wherein a thermal expansion coefficient of the first polymer material is larger than a thermal expansion coefficient of the second polymer material.

8. The preparation method according to claim 7, wherein step 1) specifically comprises:

wrapping a film composed of the first polymer material on the carbon nanotube fiber core to obtain a combined body;

applying a first twist to the combined body to obtain the first precursor fiber;

or, attaching the first polymer material to the carbon nanotube fiber core through an electrostatic spinning to form the intermediate layer; and the first twist is 750-950 turns/m.

9. The preparation method according to claim 7, wherein step 2) specifically comprises:

providing a precursor solution comprising the second polymer material and a first solvent;

carrying out an electrostatic spinning on the precursor solution and removing the first solvent to form the substrate layer; and applying a second twist to an entire composed of the substrate layer and the first precursor fiber to be twisted to form the helical shape;

the electrostatic spinning has a voltage of 12-20 kV, a flow rate of 0.5-1.5 mL/h, and a working distance of 6-12 cm;

the second twist is 4300-4700 turns/m step 3) specifically comprises:

providing a dispersion solution comprising the carbon-based conductive material, the MXene and a second solvent; and coating the dispersion solution onto the surface of the second precursor fiber and removing the second solvent to obtain the bionic neuromuscular fiber.

10. A use of the bionic neuromuscular fiber according to claim 1 in manufacturing robots, wherein the robots include software.

11. The use according to claim 10, wherein in the bionic neuromuscular fiber, a diameter of the carbon nanotube fiber core is 150-170 μm;

and/or, a thickness of the intermediate layer is 230-250 μm, a thickness of the substrate layer is 22-25 μm, and a thickness of the sensing layer is 5-7 μm;

and/or, the thermal expansion coefficient of the intermediate layer is 330-350 ppm/° C., and the thermal expansion coefficient of the substrate layer is 150-175 ppm/° C.

12. The use according to claim 10, wherein in the bionic neuromuscular fiber, a material of the intermediate layer comprises a combination of one or more than two of polydimethylsiloxane, nylon, and polytetrafluoroethylene;

and/or, the substrate layer is an electrothermal inert response substrate layer comprising a three-dimensional porous structure having a pore size of 0.8-1 μm formed by intertwining polymer nano fibers;

and/or, a material of the substrate layer comprises a combination of one or more of polyacrylonitrile and polyvinylidene fluoride.

13. The use according to claim 10, wherein in the bionic neuromuscular fiber, the carbon-based conductive material further comprises a combination of one or more than two of a single-walled carbon nanotube, a multi-walled carbon nanotube, and lamellar graphene.

14. The use according to claim 13, wherein in the carbon-based conductive material, a mass ratio of the carbon nanotube and/or the lamellar graphene to the MXene is 1:15-1:25.

15. The use according to claim 10, wherein in the bionic neuromuscular fiber, the bionic neuromuscular fiber at least simultaneously has three functions of proximity perception, electrothermal driving, and motion feedback.

* * * * *